United States Patent [19]

Desiderio

[11] 4,160,642
[45] Jul. 10, 1979

[54] METHOD FOR PREPARING DYE SOLUTIONS

[75] Inventor: Fred A. Desiderio, Cornwells Heights, Pa.

[73] Assignee: Rohm and Haas Company, Philadelphia, Pa.

[21] Appl. No.: 614,120

[22] Filed: Sep. 17, 1975

Related U.S. Application Data

[62] Division of Ser. No. 379,530, Jul. 16, 1973, Pat. No. 3,954,397.

[51] Int. Cl.² ............................................. D06P 3/32
[52] U.S. Cl. ......................................... 8/12; 8/42 R; 8/100 R; 260/42.21
[58] Field of Search ............ 260/30.2, 31.2 N, 32.4 R, 260/32.8 R, 33.2 R, 33.6 R, 859 R; 8/12; 528/75

[56] References Cited

U.S. PATENT DOCUMENTS

| | | | |
|---|---|---|---|
| 2,205,355 | 9/1943 | Grimm | 8/12 X |
| 2,328,900 | 9/1943 | Grimm | 8/12 X |
| 2,901,473 | 8/1959 | Steinemann | 8/42 R |
| 3,037,006 | 5/1962 | Hankens | 260/80.5 |
| 3,190,850 | 6/1965 | Burke | 260/42.21 |
| 3,661,923 | 5/1972 | Emmons | 260/307 F |
| 3,743,626 | 7/1963 | Emmons | 260/77.5 AQ |
| 3,954,397 | 5/1976 | Desiderio | 8/41 R |

OTHER PUBLICATIONS

Heidemann, Das Leder, 1972, vol. 23, (12), pp. 253–267, 8/12.

Primary Examiner—Melvyn I. Marquis
Attorney, Agent, or Firm—Terence P. Strobaugh

[57] ABSTRACT

A method is disclosed for improving the solubility of Lewis acid dyes including metal chelate dyes and acid dyes, in solvents employing a copolymer based on a monomer containing a 5- or 6-membered heterocyclic tertiary amine. Dye solutions prepared by this process are useful in dyeing leather, in dyeing coatings and plastic articles, and are especially useful in combination with reactive urethane systems.

19 Claims, No Drawings

METHOD FOR PREPARING DYE SOLUTIONS

This is a division of application Ser. No. 379,530 filed July 16, 1973, now U.S. Pat. No. 3,954,397 issued May 4, 1976.

BACKGROUND OF THE INVENTION

1. Field of the Invention

This invention relates to the preparation of dye solutions where the dye is a Lewis acid, for example, the metal chelate dyes or acid dyes containing acid groups such as carboxy, sulfo or hydroxy. These dye solutions may be used with a variety of solvents in which the dye was previously only slightly soluble. More importantly, it is now possible to prepare dye solutions in solvents which are compatible with reactive urethane prepolymers.

2. Description of the Prior Art

The increasing popularity of polyurethane in the coating industry can be attributed to the wide latitude of tactile and visual effects which careful chemical design has made possible as well as to the recognized superior physical performance which urethanes have.

It is well known in the art that in the formulation of metal complex dye solutions for use with conventional lacquers, dyes can be dissolved in alcohols and alcohol-like solvents such as the lower alkanols including propanol and the like or in methyl cellosolve. These solutions, however, cannot be employed with reactive isocyanate systems because of the presence of alcohol solvents which are reactive with isocyanate groups.

It is well known to employ primary, secondary, or tertiary amines to increase the solubility of the dyes in the solvents employed with the conventional lacquers. However, primary and secondary amines react with isocyanates and the tertiary amines, which can not combine with the isocyanates, cause trimerization and polymerization, especially where the isocyanate is an aromatic isocyanate such as toluene diisocyanate, methylenebis (phenylisocyanate) or an isocyanate prepolymer prepared therefrom. Therefore, the ordinary amines employed with the conventional lacquers cannot be employed with the reactive polyurethanes.

Reactive polyurethanes are defined as those polyurethanes which contain unreacted isocyanate groups. Generally, the isocyanates are present as prepolymers although monomeric isocyanate containing materials may be employed. Not high enough in molecular weight to be classified as a polymer, a prepolymer is described as a partially reacted isocyanate which still contains unreacted isocyanate groups that can combine with moisture or other curing agents such as multi functional alcohols, amines or acids to produce a true polyurethane. A complete description of the prepolymers is found in U.S. patent application Ser. No. 7,270 filed Jan. 30, 1970, now U.S. Pat. No. 3,743,626, application is hereby incorporated by reference.

To dissolve urethanes, it is well known to employ solvents which do not contain groups which can react with isocyanates such as esters, ethers, ketones or aliphatic and aromatic hydrocarbons. However, until now, these solvents could not be employed with the metal chelate dyes due to the low solubility of these dyes in said solvents.

The superiority of the metal chelate dyes is well recognized in the art because of their high color strength, brilliance and transparency. Also, said dyes have exceptional fastness to light, heat and chemicals. Therefore, there has been a continuing search for a solvent system to permit the use of the metal chelate dyes with reactive polyurethane systems. Further, even is systems where it is not necessary to exclude the polyurethane reactive solvent, it may be desirable to be able to work with more concentrated solutions of dyes in other solvents. Thus, a material which substantially increases the solubility of a dye is desirable.

SUMMARY OF THE INVENTION

This invention relates to a process for increasing the solubility of a Lewis acid dye such as a metal chelate dye or an acid dye, for example a dye containing an acid functional group or groups including a carboxy, sulfo, or hydroxy group, in a solvent selected from a ketone, ester, ether, aliphatic hydrocarbon, aromatic hydrocarbon and the like, or combinations of these solvents with other solvents, wherein the solutions contain the above mentioned solvents as a major proportion of the solution employing a 5- or 6-membered heterocyclic tertiary amine (I, infra). In general the process comprises dissolving dyes in a solution containing a 5- or 6-membered heterocyclic tertiary amine or a copolymer containing said amine wherein the amine has the following structural formula:

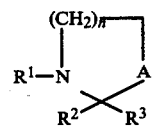

wherein A is oxy or thio and $R^1$ is an organic group bonded to the nitrogen atom of the ring through a carbon atom, and is preferably lower alkyl, such as methyl, ethyl and the like or an acryloxy lower alkyl radical of the formula;

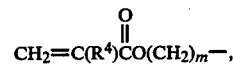

wherein $R^4$ is hydrogen or lower alkyl such as methyl and the like, m is an integer having a value of 2-3; $R^2$ is hydrogen or alkyl of from 1 to 12 carbon atoms such as methyl, ethyl, n-propyl, isopropyl, n-butyl, pentyl, isopentyl, and the like; $R^3$ is hydrogen, phenyl, benzyl or alkyl of from 1 to 4 carbon atoms such as methyl, ethyl, n-propyl, isopropyl, n-butyl, isobutyl and the like, or $R^2$ and $R^3$ may be joined, together with the carbon atom to which they are attached, to form a 5- or 6-membered hydrocarbyl ring such as cyclopentyl, cyclohexyl and the like, and n is an integer having a value of 1 to 2.

The heterocyclic tertiary amines are known compounds, and the aforesaid appear in U.S. Pat. No. 3,037,006 and U.S. Pat. No. 3,743,626, and are hereby incorporated by reference.

Examples of the tertiary amines which can be employed in this invention include 3-methacryloxyethyl-1,3-oxazolidine, 3-methacryloxyethyl-tetrahydro-1,3-oxazine, 3-methacryloxyethyl-2-isopropyl, 1, 3-oxazolidine, 3-methacryloxyethyl-2-isopropyltetrahydro-1,3-oxazine, 3-methacryloxyethyl-2,2-pentamethylene-1,3-oxazolidine, 3-methacryloxyethyl-2,2-tetramethylene-1,3-oxazolidine, 2-isopropyl-3-methyl-1,3-oxazolidine, 2-phenyl-3-methyl-1,3-oxazolidine, 2-isopropyl-3-butyl-1,3-oxazolidine, 3-decyl-1,3-oxazolidine, 3-heptadecyl- 1,3-oxazolidine, 2-isopropyl-4,4-dimethyl-3-octyl-1,3-oxazolidine, 2,2-pentamethylene-1,3-oxazolidine, 2-isopropyl-3-methyl-tetrahydro-1,3-oxazine, 2-phenyl-3-methyl-tetrahydro-1,3-oxazine, 2-isopropyl-3-butyltetrahydro-1,3-oxazine, 3-decyl-tetrahydro-1,3-oxazine, 3-heptadecyl-tetrahydro-1,3-oxazine, 2-isopropyl-4-dimethyl-3-octyl-tetrahydro-1,3-oxazine, 2-methyl-1,3-thiazolidine and the like.

A preferred embodiment of this invention is the preparation of a metal chelate dye solution in a ketone or ester solvent employing a copolymer containing as a comonomer N-methacryloxy-lower-alkyl oxazolidine (II, infra) having the following structural formula:

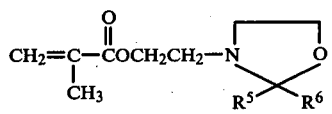

II wherein $R^5$ is hydrogen; $R^6$ is hydrogen, isopropyl or phenyl or $R^5$ and $R^6$ may be joined together with the carbon atom to which they are attached to form cyclopentyl or cyclohexyl. Metal chelate dye solutions prepared with copolymers containing the compound of Formula II have proved especially effective when employed in compositions based on reactive urethanes as defined above.

Applicant does not wish to be bound to any particular mechanism as to how solubilization occurs. However, one possible explanation for this phenomenon is complex formation between the electronegative nitrogen or oxygen atoms, or both, of the heterocyclic ring with an electron deficient center of the metal complex or acidic function in the dye molecule. In addition, the lyophilic nature of the remainder of the heterocyclic ring containing molecule together with any polymers present render the complexed molecule more soluble in organic solvent systems. This explanation is substantiated by the fact that one sees a variation in effectiveness of various oxazolidines as dye solubilizers. For example, (in an aromatic hydrocarbon solvent) an acrylic copolymer of the composition (all parts by weight): butyl acrylate (90)/methyl methacrylate (5)/oxazolidinylethyl methacrylate (5) provides very good solubilization of the metal complex dyes which presumably complex with the oxazolidine group. On the other hand, oxazolidines such as 2-isopropyl-3-methyloxazolidine which contain no large hydrocarbon residue do not change the lyophilic character of the dye complexed to the same extent and although they improve the solubilization, the degree of improvement of solubilization is less. Intermediate between these two mentioned oxazolidines is 3-butyloxyethyloxazolidine. Therefore, all of the heterocyclic tertiary amines (I, supra) provide some solubilization. However, the preferred amines contain groups on the nitrogen atom which improve the lyophilic character of the complex.

The basicity or nucleophilicity of the heterocyclic tertiary amine employed is critical when the isocyanates are employed as a component of the coating. The heterocyclic tertiary amines (I) are less basic and less nucleophilic than ordinary trialkyl amines in which there are no electronegative atoms neighboring to the basic nitrogen atom. The pKa of the conjugate acid of an oxazolidine, for example, can be estimated to be 1-2 pKa units lower than ordinary trialkylamine.

It is well known that tertiary amines cause trimerization or polymerization of reactive urethane systems. However, possibly because of the lower basicity of the heterocyclic tertiary amines of the instant invention they can be employed with reactive isocyanate systems since the rate of polymerization of the isocyanates has been reduced to the point where it no longer interferes with the desired reaction. Surprisingly it is thought that the heterocyclic amines of the instant invention possess a unique balance of basicity and nucleophilicity such that solubilization of Lewis Acid type dyes is enhanced yet polymerization of isocyanates is not encouraged.

The pKa of an oxazolidine or oxazine cannot be measured in water and thus cannot be compared to the pKa of many other tertiary amines which are readily available in tabulated form based on aqueous titrations. The reason for this is that oxazolidines and oxazines are not entirely stable in water and undergo a ring opening hydrolysis reaction. For example, on titration with an acid, oxazolidones can undergo some degree of ring opening in water thus leading to two possible protonated species, the one the conjugate of the oxazolidine base itself, the other a new species derived by hydrolysis. Various intermediate structures are possible including one in which the ring is opened but a carbonyl moiety is not split out as a separate molecule.

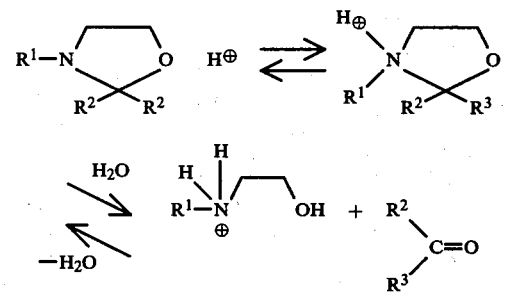

wherein $R^1$, $R^2$ and $R^3$ are as defined above.

The amount of heterocyclic tertiary amine (I, supra) employed may vary from a minimum of $10^{-5}$ moles of amine/gram of solid dye to about $10^{-1}$ moles of amine/gram of solid dye and is preferably in the range of from about $10^{-4}$ moles of amine/gram of solid dye to about $10^{-3}$ moles of amine/gram of solid dye.

Metal chelate dyes can now be employed with reactive urethane systems. Examples of such dyes include the metal chelate dyes such as those metal complexed dyes described in the *Colour Index*, (5 vols.; The Society of Dyers and Colourists, Third Edition, 1971), III, 3563–3648. Examples of the dyes include the azometallized, the monoazo metal complex, the monoazo chromium complex, the monoazo 1:2 chromium complex and the like. Specific examples of the type of dyes which may now be successfully employed with the reactive urethane prepolymers include the following, using the Colour Index Classification system for "Solvent Dyes" as identification: Yellow 13, 61, 62, 63, or 88; Orange 44, 57, 58 or 59; Blue 48; Brown 28, 29, 42, or 43; Black 29, 30, 34, or 35; Green 21; Violet 21 and the like. Also, acid containing dyes are solubilized. Examples of the acid dyes which may be employed appear in the Technical Manual of The American Association of Textile Chemists and Colourists (Vols. 1966), pp D85–93. Examples of the acid containing dyes include Acid Yellow 1, 2, 3, 4, 7; Acid Orange 1, 2, 3, 12; Acid Blue 1, 5, 7, 41, 78; Acid Brown 2, 14, 15; Acid Black 2, 24, 58, 60; Acid Green 1, 12, 20; Acid Violet 1, 7, 49; Acid Red 1, 4, 12, 14; and the like.

This invention permits the user to employ solvents or mixtures of solvents which could not be employed before due to the low solubility of the dye in the particular solvent. Also, it is now possible to employ a lower volume of solvent than could previously be employed which is of significance in reducing air pollution. Solvents which are suitable for use with the reactive urethane systems should be substantially free from active hydrogen atoms as determined by the Zerewitinoff method, described in Kohler et al., J. Amer. Chem. Soc., 40, 2181-8 (1927). Also the solvents should be substantially anhydrous.

The following is a representative list of the type of solvent which can be employed with reactive urethane systems: cyclohexanone (VG), pentoxone (G), n-butyl acetate (F), methyl hexyl ketone (F), methylamyl acetate (F), pentyletate (F), isobutyl isobutyrate (P), diisobutylketone (P), hexyl acetate (P), methyl isoamyl ketone (P), methyl n-butyl ketone (P), ethylamyl ketone (P), 2-ethoxyethylacetate (P), a mixed aromatic hydrocarbon having a Kauri butanol No. of 91 and a bp of 311°–344° F., Solvesso - 100 (VP), xylol (VP). Other solvents include: butyl cellosolve acetate, n-propyl acetate, isobutyl acetate, butyl acetate, i-propyl acetate, ethyl acetate, xylene, toluene, ethylbenzene, benzene, tetrahydrofuran, dioxane, isophorone, methyl ethyl ketone, methyl isobutyl ketone, mesityl oxide, methyl amylketone, chlorobenzene, 1,2-dichloroethylene, methylene dichloride, 1-nitropropane, 2-nitropropane. It should be noted than an excess of the particular amine employed may be employed as the solvent.

Also other solvents can be employed when working with systems other than the reactive polyurethanes such as diacetone alcohol (VG), ethyl lactate (G), and other alcohols and the well known ether and ester analogues of ethylene glycol.

Following some of the above mentioned solvents is a symbol indicating the rating the solvent received based upon its ability to solubilize dye-stuffs without any oxazolidine compounds present. VG=very good; G=good; F=fair; P=poor; and VP=very poor. A combination of a solvent rated VG such as cyclohexanone with an oxazolidine capable of complexing with the dye such as oxazolidinylethyl methacrylate or copolymers thereof, would therefore cause the greatest dye solubilization. However, useful combinations of the type of solvents disclosed above can be employed to reduce solvent cost, control evaporation rate and control processing time.

The heterocyclic tertiary amine (I, supra) may be employed by itself to prepare the dye solutions; however, those heterocyclic tertiary amines containing suitably reactive functional groups are preferably copolymerized with other monomers.

Other monomers which may be employed include those having the following structural formula:

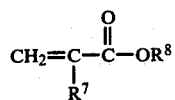

wherein $R^7$ is hydrogen or lower alkyl ($C_1$–$C_4$) such as methyl, ethyl, n-propyl, butyl and the like and $R^8$ is a straight, branched or cyclic radical having from 2 to 14 carbon atoms for example an alkyl, alkoxyalkyl or alkylthioalkyl including ethyl, n-propyl, n-butyl, isobutyl, 1- or 2-methylbutyl, hexyl, 2-methylpentyl, heptyl, octyl, 2-ethylhexyl, decyl, 6-methylmonyl, dodecyl, methoxybutyl, ethoxybutyl, butoxybutyl, methylthioethyl, ethylthioethyl, ethylthiopropyl, cyclopentyl, cyclohexyl, and the like.

Also there may be employed monomers having the formula

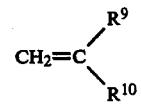

wherein $R^9$ and $R^{10}$ are the same or different radicals selected from hydrogen, halo such as chloro and the like, lower alkanoyloxy such as acetoxy and the like, cyano, formyl, phenyl, carbamoyl, epoxy and the like.

The choice of monomers employed is limited only by the end use of the polymers and in view of this disclosure would now be obvious to those skilled in the art. When used in soft plastics or as a coating for flexible material such as leather and leather like materials, it may be preferred to employ a high proportion (>50%) of "soft" monomers such as butyl acrylate or ethyl acrylate to control the film embrittlement caused by the hardening effect of the dyes which may be employed; however, this decision is dependent upon the nature of other components of the coating, for example, plasticizers may be added to offset the hardness of harder polymers.

When the heterocyclic tertiary amine is capable of being incorporated as a comonomer in a polymer, the amount of monomer or comonomers employed in combination with the polymerizable heterocyclic tertiary amines (I, supra) are from about 75 to about 98 percent and preferably from about 80 to about 95 percent, i.e., the amount of tertiary amine varies from 2 to 25 percent and preferably from 5 to 20 percent.

This invention discloses, for the first time, how to prepare dye solutions in an ester, ether, ketone, aliphatic hydrocarbon and aromatic hydrocarbon solvent or mixtures of these solvents or other solvents containing the solvents mentioned. The preferred solvents for use with the reactive isocyanates are the esters and ketones.

Due to the nature of the dyes employed, it has been found that the use of a non-ionic surfactant, though not affecting the solubility of the dye, aids in keeping any non-dissolved portion of the dye suspended. This combination of dye solubility plus dye suspension affords dye mixtures capable of achieving dyeing results previously unobtainable with these dyes especially when used with reactive polyurethane prepolymers. The non-ionic surfactants which can be used are preferably, alkylarylpolyether esters such as the octylphenol ethylene oxide adducts especially the benzyl ethers thereof, however, the alkylaryl ether alcohols or alkylaryl polyether alcohols may also be employed since the amount of alcohols employed is relatively low compared to the number of isocyanate groups and therefore does not substantially interfere with the desired reactivity of the isocyanate groups. These and other anionic surface-active agents which can be employed are known in the art.

These dye solutions used together with urethane containing coatings are especially useful in coating leather and can be employed as a pretreatment coat to not only dye the leather but also to improve the adhesion of subsequent finish coats to the leather. Also, the dye coats may be applied to a base coat or to the finish coat depending upon the type of effect desired. In addition to the dye, the coating composition contains a reactive acrylic polymer and a reactive polyurethane prepolymer.

The following examples illustrate this invention; however, it is to be understood that other reactants functionally equivalent to those specifically employed will also operate to afford similar results.

EXAMPLE 1

Copolymer of methylmethacrylate and oxazolidinylethyl methacrylate

The copolymer is prepared by gradually adding over a 3 hour period a monomer mix containing methyl methacrylate (1425 parts), 91.6% pure oxazolidinylethyl methacrylate (82 parts), azoisobutyronitrile initiator (37.5 parts), toluene (592 parts) to a flask containing toluene (895 parts) at 90° C. After the monomer feed is complete, the reaction mixture is maintained at 90° C. for 15 minutes and after this holding period a reinitiation solution of azoisobisbutyronitrile (6 parts) dissolved in toluene (750 parts) is added over a 45 minute period while refluxing the reaction mixture. Upon completion, addition of the reaction mixture is refluxed for an additional 15 minutes. The resultant copolymer is a clean, light yellow colored solution having a viscosity of 100 cps and 38.9% solids.

EXAMPLE 2

Copolymer containing methyl methacrylate, butyl acrylate and oxazolidinylethyl methacrylate The copolymer is prepared by adding a monomer mix containing methyl methacrylate (6.3 parts), butyl acrylate (114 parts), and 91.6% pure oxazolidinylethyl methacrylate (6.9 parts) in one stream; and a solution of azobisisobutyronitrile (0.38 parts), a mixed aromatic hydrocarbon (b.p. 311°–344° F.), (50.5 parts) in a second stream to a kettle with a mixed aromatic hydrocarbon (b.p. 311°–344° F.), (75.7 parts) heated to 90° C. The two streams are added gradually and simultaneously over a three hour period maintaining the temperature at 90° C. A solution of azobisisobutyronitrile (0.51 parts) in a mixed aromatic hydrocarbon (b.p. 311°–344° F.), (6.3 parts) is added over three-quarters of an hour, raising the temperature to 112° C. at the start of addition. A quater-hour additional heating completes the polymerization. The product has a viscosity of 30 cps; and is at 39.1% solids.

EXAMPLE 3

Preparation of Dye Solutions

Four solutions: A, B, C and D of the composition indicated in Table I, infra, are prepared by adding cyclohexanone to the dye and the polymer. The mixture is dispersed in a Cowles Dissolver at room temperature at a speed of approximately 2000 rpm using a 3 inch diameter blade in a Cowles dissolver for 15 minutes, then butyl acetate (22.4 parts) is added and agitation is continued for 10 minutes, more butyl acetate (22.4 parts) is added and agitation continued for an additional 5 minutes. This is the preferred method to prepare the dye solutions. However the solutions may also be prepared by simple mixing, stirring or tumbling after combining all of the ingredients.

TABLE I

| Dye Solutions | Dye Solution Composition[1] | | | |
|---|---|---|---|---|
| | A | B | C | D |
| Cyclohexanone | 44.8 | 44.8 | 44.8 | 23.7 |
| Copolymer of Example 1 | 7.5 | 7.5 | 7.5 | — |
| Copolymer of Example 2 | — | — | — | 3.75 |
| Solvent Orange 58 | 3 | — | — | 1.50 |
| Solvent Yellow 88 | — | 3 | — | — |
| Solvent Black | — | — | 3 | — |
| Butyl Acetate | 44.8 | 44.8 | 44.8 | 71.1 |

[1] All parts by weight

Because of the extremely fine state of subdivision of the dye, and the effect of milling on a Cowles dissolver, which further tends to reduce particle size, filtration in a manner which would permit quantitative estimation of undissolved material is extremely difficult. Filters capable of collecting the undissolved dye are extremely prone to clogging. Visual estimation of the relative sedimentation after standing one day at room temperature provides a useful qualitative guide to determine dye solubilization and the results are reported in Table II infra, (Non-ionic surfactants may be added to keep the non-dissolved dyes suspended, but were not added in this experiment intended to use sedimentation as a measurement of dye solubilization.

TABLE II

| Dye Solution | Amount of Sedimentation | | | |
|---|---|---|---|---|
| | A | B | C | D |
| Sedimentation | very slight | very slight | very slight | slight |

EXAMPLE 4

Yellow Dye Solution

Step A
Polymer containing butylacrylate, methyl methacrylate and oxazolidinylethyl methacrylate By following substantially the procedure described in Example 2 using butyl acrylate (90 parts), methyl methacrylate (5 parts) and oxazolidinylethyl methacrylate (5 parts), the desired copolymer is obtained having a viscosity of 60 cps and is at 40% solids.

Step B
Yellow Dye Solution

To a mixture of the copolymer of Step A above (7.5 parts) and the hydroxyazo metal chelate dye (3.0 parts of Solvent Yellow 88) is added cyclohexanone (44.8 parts) and a non-ionic surfactant, (benzylether of octylphenol ethylene oxide adduct 1.8 parts). The mixture is dispersed in a Cowles Dissolver at 2000 rpm using a 3-inch blade. Butyl acetate is added in two equal solutions (totals 42.9 parts) while agitating the mixture.

By substituting for the Solvent Yellow 88 an equal quantity of Solvent Orange 58, Solvent Brown 42 or 43, Solvent Blue 48 or Solvent Black 29 and by following substantially the procedure described in Example 4, the corresponding dye solutions are prepared.

In a manner similar to that described in Example 4, Steps A and B for the preparation of the Yellow dye solution all of the dye solutions described in the following Table III may be prepared. Thus, by substituting an appropriate heterocyclic tertiary amine for the oxazolidinyl ethyl methacrylate or by substituting for the cyclohexanone another urethane compatable solvent or by substituting another dye for the Solvent Yellow 88 dye disclosed and by following substantially the procedure described therein, the corresponding urethane compatable dye solutions may be obtained.

TABLE III

| Example Number | Dye (Colour Index No.) | Solvent | Amine or Polymer Composition with Amine |
|---|---|---|---|
| 5 | Solvent Brown 43 | Mixed Aromatic hydrocarbon (b.p. 311°–344° F.) (Solvesso-100) | 90 BA . 5MM/5 OXEMA |
| 6 | " | Cyclohexanone | " |
| 7 | " | Cyclohexanone/ butyl acetate (1:1) | " |
| 8 | " | Mixed Aromatic hydrocarbon (b.p. 311°–344° F.) | 2-isopropyl-3-methyl-(1,3)-oxazolidine |
| 9 | " | " | 2-phenyl-3-methyl (1,3)-oxazolidine |
| 10 | " | " | 3-butyloxy ethyl-1,3-oxazolidine |
| 11 | Solvent Red 51 | " | 60BA/20MMA/20 OXEMA |
| 12 | " | " | 90BA/5MMA/50 OXEMA |
| 13 | Acid Orange 76 | " | " |

BA = butyl acrylate; MMA = methyl acrylate; OXEMA = oxazolidinylethyl methacrylate

EXAMPLE 14

Formulation For Dyeing Leather

| Order of Addition | 10% Solids Volume | 10% Solids Weight | 5% Solids Volume | 5% Solids Weight |
|---|---|---|---|---|
| 1. Reactive acrylic polymer | 10 | 78.5 | 10 | 78.5 |
| 2. Dye Solutions (A,B,C or D) | up to 80 | up to 620 | up to 80 | up to 620 |
| 3. Solvent (Solvesso-100) | 80 | 578 | 185 | 1335 |
| 4. Reactive urethane-prepolymer | 10 | 79.7 | 10 | 79.7 |

The ingredients are blended together by simple mixing and applied to the leather by air-spray and then dried.

EXAMPLE 15

A Dye Blotch Coat Formulation

| Order of Addition | 10% Solids Volume | 10% Solids Weight | 5% Solids Volume | 5% Solids Weight |
|---|---|---|---|---|
| 1. Reactive urethane-prepolymer | 10 | 80.3 | 10 | 80.3 |
| 2. Butylacetate (50) Xylol (40) Cellosolve Acetate (10) | 40 | 294.0 | 120 | 882 |
| 3. Nitrocellulose in Solvent | 30 | 231.0 | 30 | 231 |
| 4. Dye Solutions (A,B,C or D) | up to 40 | up to 310 | up to 40 | up to 310 |

The ingredients are mixed and applied to the leather by airspray and then dried at 120° F.

One skilled in the art will appreciate that the processes disclosed above are merely illustrative and are capable of a wide variation and modification without departing from the spirit of this invention.

What is claimed is:

1. A process for increasing the solubility of a hydroxyazo metal chelate dye in an effective solvent substantially free from active hydrogen atoms as determined by the Zerewitinoff Method which comprises treating said dye with a copolymer of oxazolidinylethyl methacrylate and one or more monomers copolymerizable therewith.

2. The process of claim 1 wherein the metal chelate dye is selected from Solvent Yellow 88, Solvent Orange 58, Solvent Brown 42, Solvent Brown 43, Solvent Blue 48, Solvent Black 29.

3. A process for preparing a urethane compatable dye solution which comprises treating a metal chelate dye with a copolymer of oxazolidinylethyl methacrylate and one or more monomers copolymerizable therewith in a mixture of cyclohexanone and butyl acetate.

4. A composition useful in dyeing which comprises a solution of:
(a) a metal chelate dye or acid dye;
(b) a 5- or 6- membered heterocyclic tertiary amine copolymer wherein the tertiary amine has the formula:

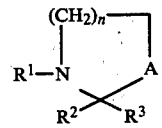

wherein A is oxy or thio; $R^1$ is an organic radical; $R^2$ is hydrogen or alkyl and $R^3$ is hydrogen, phenyl, benzyl, or alkyl or $R^2$ and $R^3$ may be joined to form together with the carbon atom to which they are attached, a 5- or 6-membered hydrocarbyl ring and n is an integer having a value of 1–2;
said tertiary amine being copolymerized with one or more monomers selected from

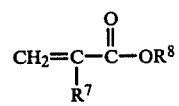

wherein $R^7$ is hydrogen or lower alkyl and $R^8$ is a straight, branched or cyclic radical having from 2 to 14 carbon atoms, and

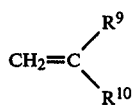

wherein $R^9$ and $R^{10}$ are the same or different radicals selected from hydrogen, halo, lower alkanoyloxy, cyano, formyl, phenyl, carbamoyl or epoxy; and (c) a solvent substantially free from active hydrogen atoms as determined by the Zerewitinoff Method selected from a ketone, ester, ether, aliphatic hydrocarbon, aromatic hydrocarbon or an excess of said tertiary amine.

5. A composition as in claim 4 wherein $R^1$ of the tertiary amine is a radical of the formula

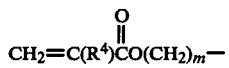

wherein $R^4$ is hydrogen or lower alkyl and m is an integer having a value of 2-3.

6. A method of dyeing which comprises treating a substrate with the composition of claim 4.

7. The method of claim 6 wherein the substrate is leather or a flexible, polymeric leather-like material.

8. The composition of claim 4 wherein the copolymer is composed of methyl methacrylate and oxazolidinylethyl methacrylate.

9. The composition of claim 4 wherein the copolymer is composed of methyl methacrylate, butyl acrylate and oxazolidinylethyl methacrylate.

10. A composition which comprises the composition of claim 4 and a reactive polyurethane.

11. A method of dyeing which comprises treating a substrate with the composition of claim 8.

12. A method of dyeing which comprises treating a substrate with the composition of claim 9.

13. The method of claim 11 wherein the substrate is leather or a flexible, polymeric leather-like material.

14. The method of claim 12 wherein the substrate is leather or a flexible, polymeric leather-like material.

15. A process for increasing the solubility of a metal chelate dye or acid dye in an effective solvent substantially free from active hydrogen atoms as determined by the Zerewitinoff Method, which comprises dissolving the dye in an effective solution containing said solvent and a 5- or 6-membered heterocyclic tertiary amine copolymer, said tertiary amine having the following structural formula:

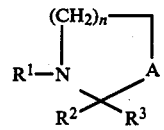

wherein A is oxy or thio, $R^1$ is a copolymerizable organic radical, $R^2$ is hydrogen or alkyl and $R^3$ is hydrogen, phenyl, benzyl, or alkyl or $R^2$ and $R^3$ may be joined together with the carbon atom to which they are attached to form a 5- or 6-membered hydrocarbyl ring and n is an integer having a value of 1-2;

said tertiary amine being copolymerized with one or more monomers selected from

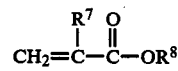

wherein $R^7$ is hydrogen or lower alkyl and $R^8$ is a straight, branched or cyclic radical having from 2 to 14 carbon atoms, and

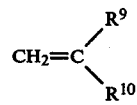

wherein $R^9$ and $R^{10}$ are the same or different radicals selected from hydrogen, halo, lower alkanoxyloxy, cyano, formyl, phenyl, carbamoyl or epoxy.

16. A process as in claim 15 wherein $R^1$ of the tertiary amine is a radical of the formula

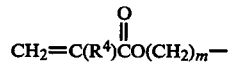

wherein $R^4$ is hydrogen or lower alkyl and m is an integer having a value of 2-3.

17. The process of claim 15 wherein the copolymer is composed of methyl methacrylate and oxazolidinylethyl methacrylate.

18. The process of claim 15 wherein the copolymer is composed of methyl methacrylate, butyl acrylate, and oxazolidinylethyl methacrylate.

19. The process of claim 15 wherein the 5- or 6-membered heterocyclic amine is from 2 to 25 percent of the copolymer.

* * * * *